Figure 1:
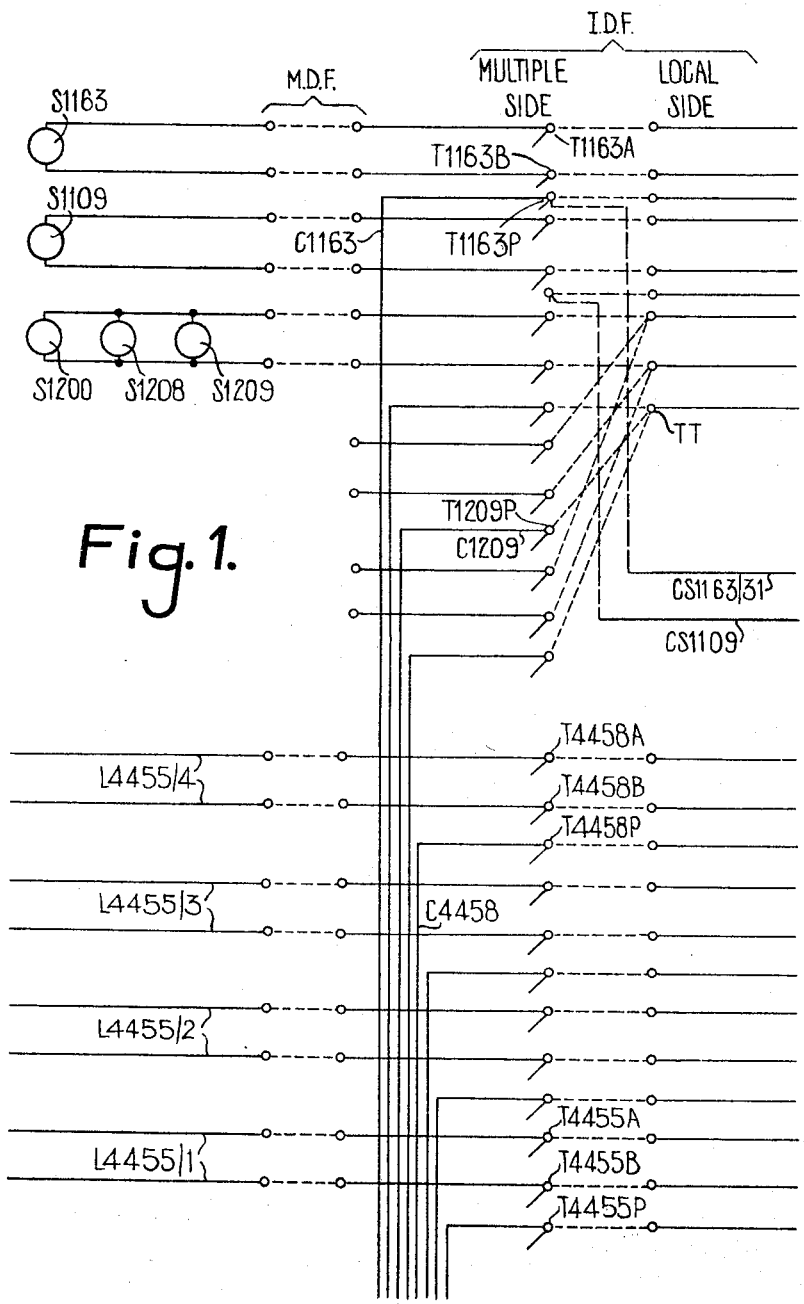
Figure 2:
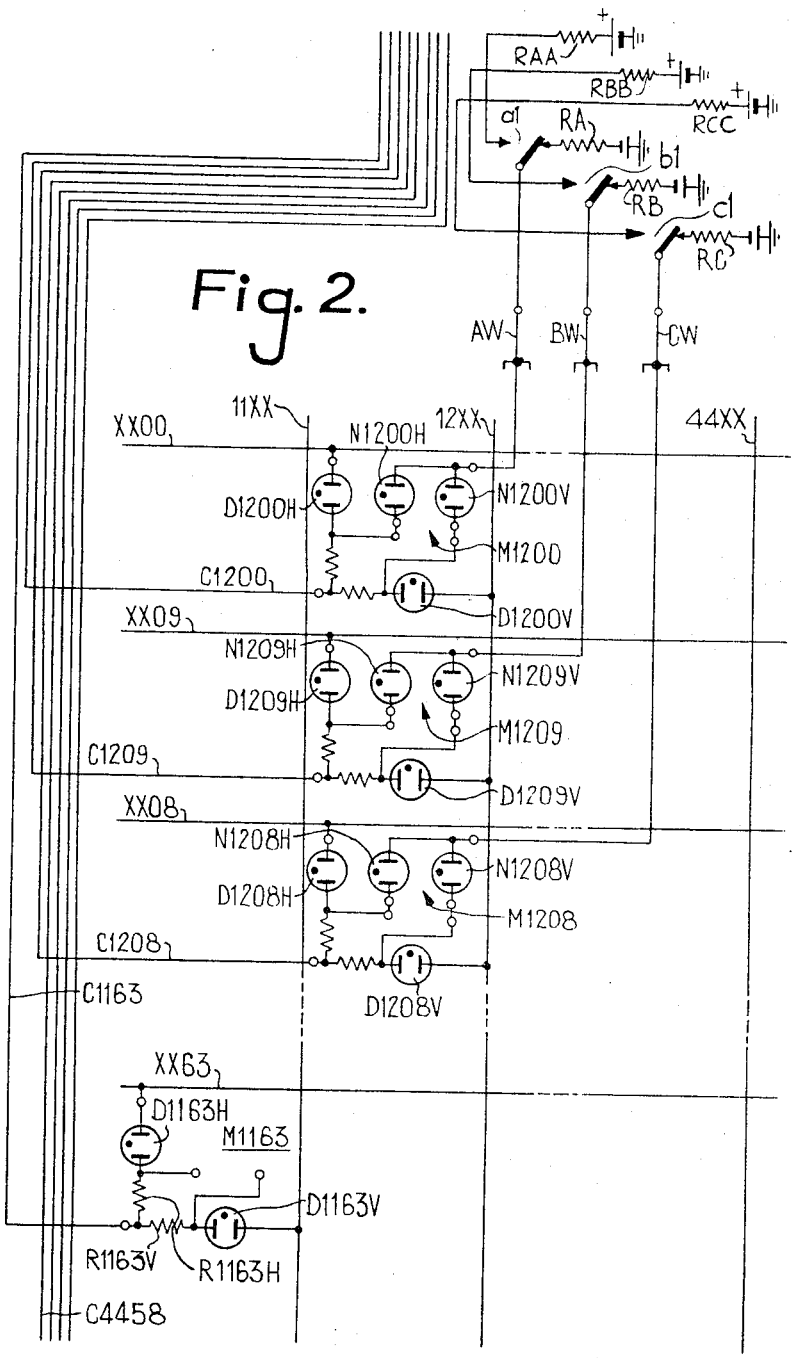
Figure 3:
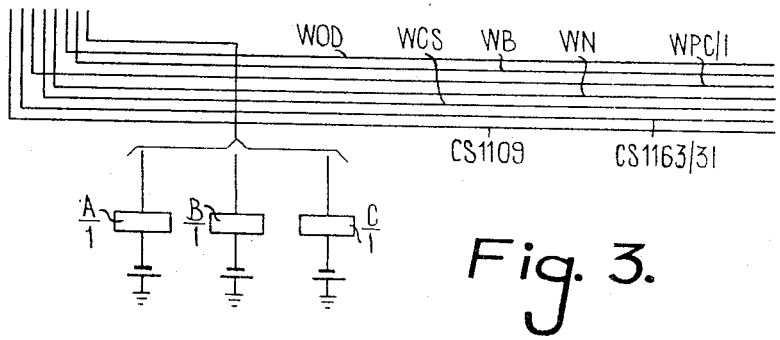
Figure 3:
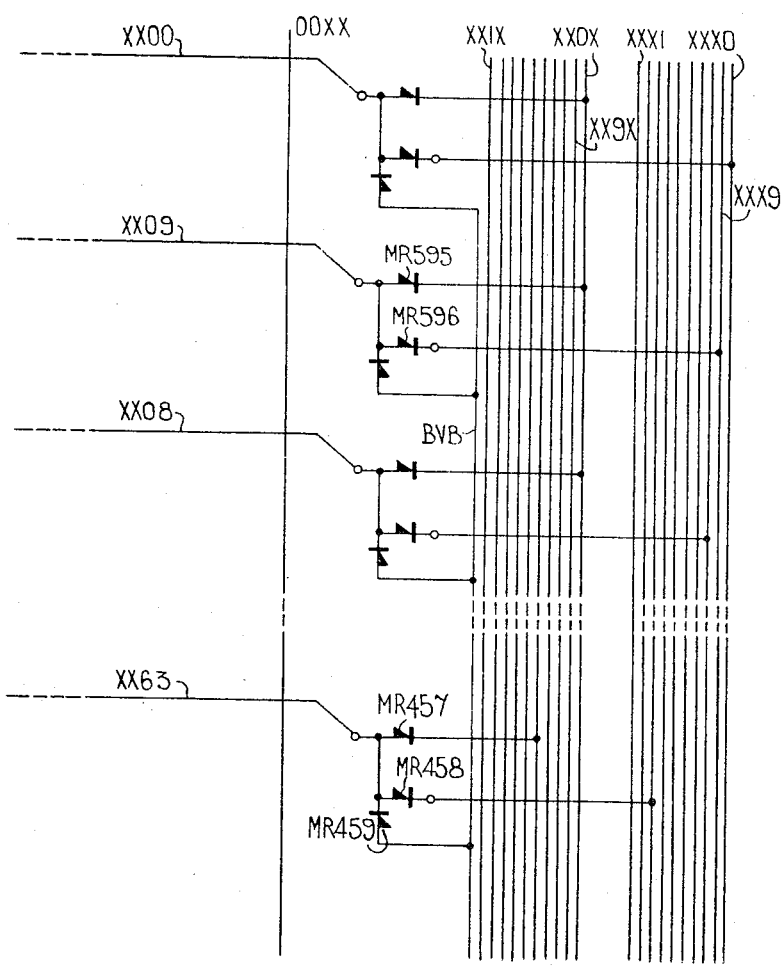
Figure 4:
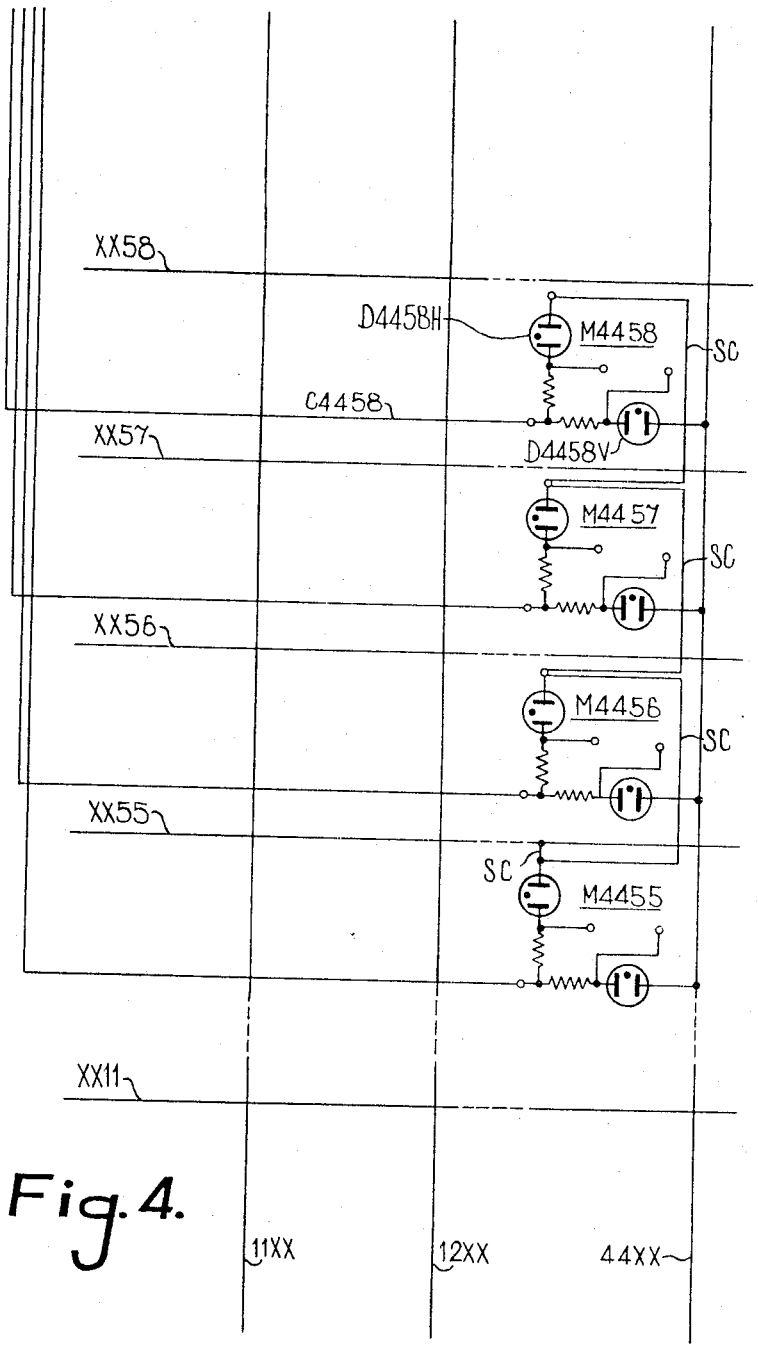
Figure 5:
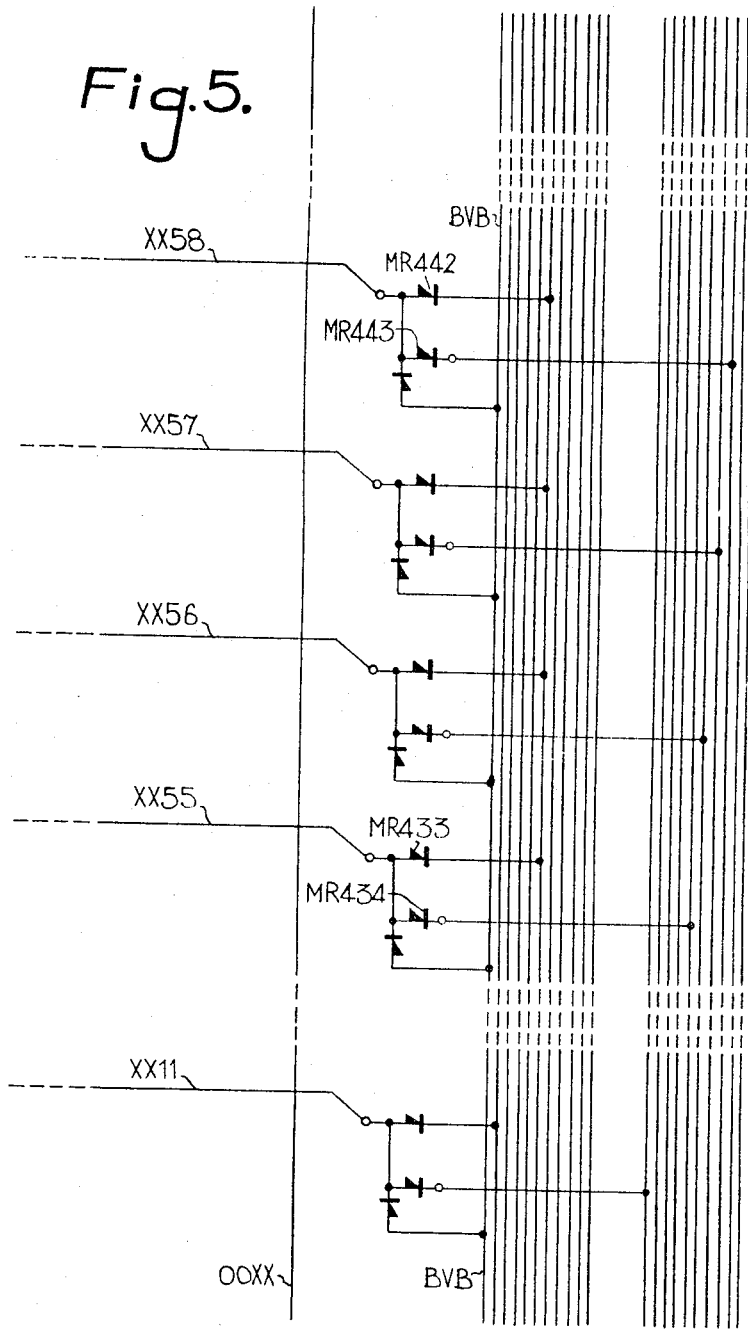
Figure 6:
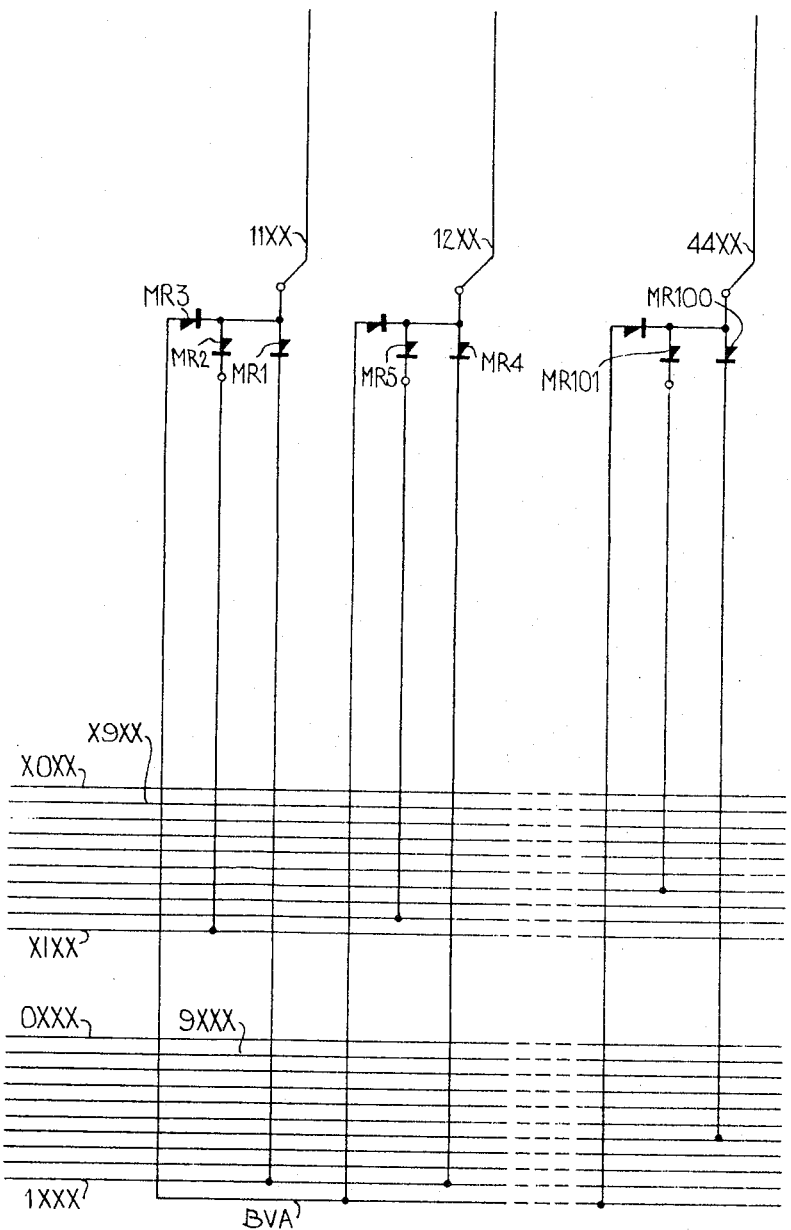
Figure 7:
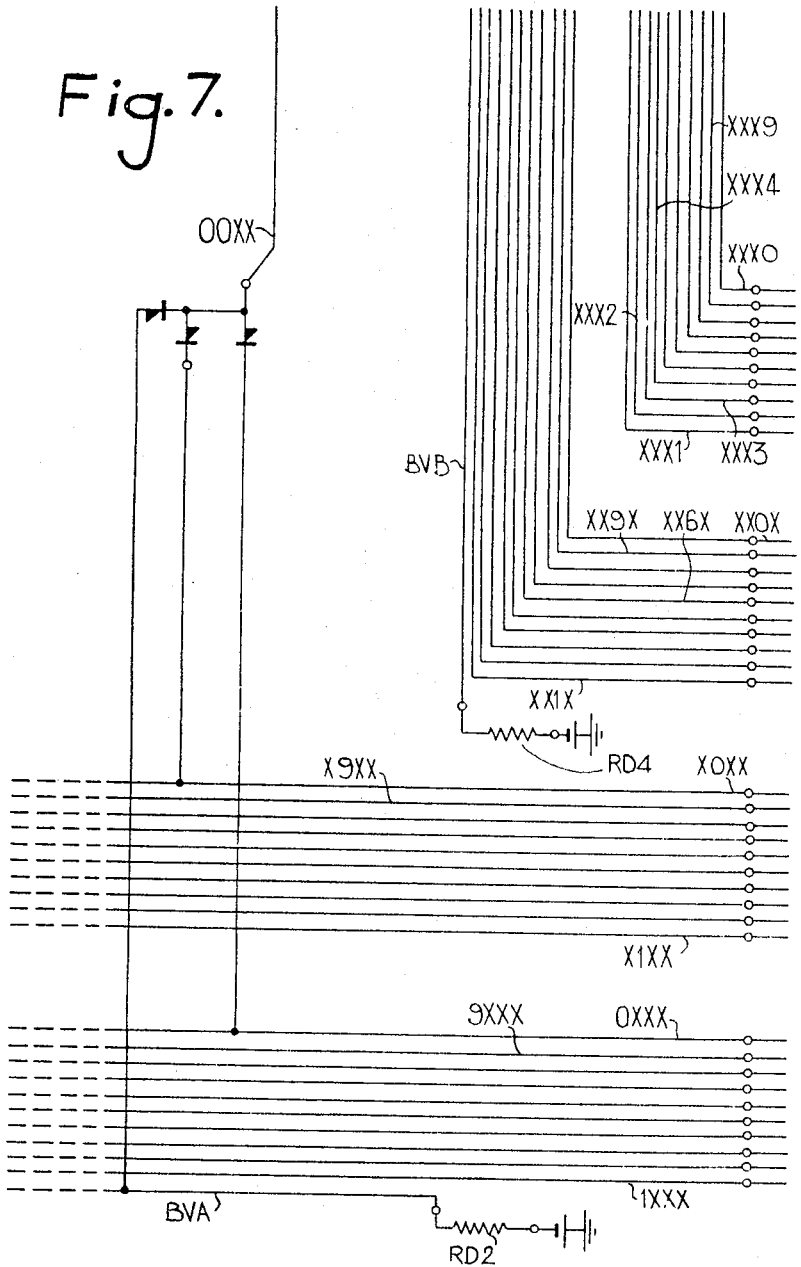
Figure 8:
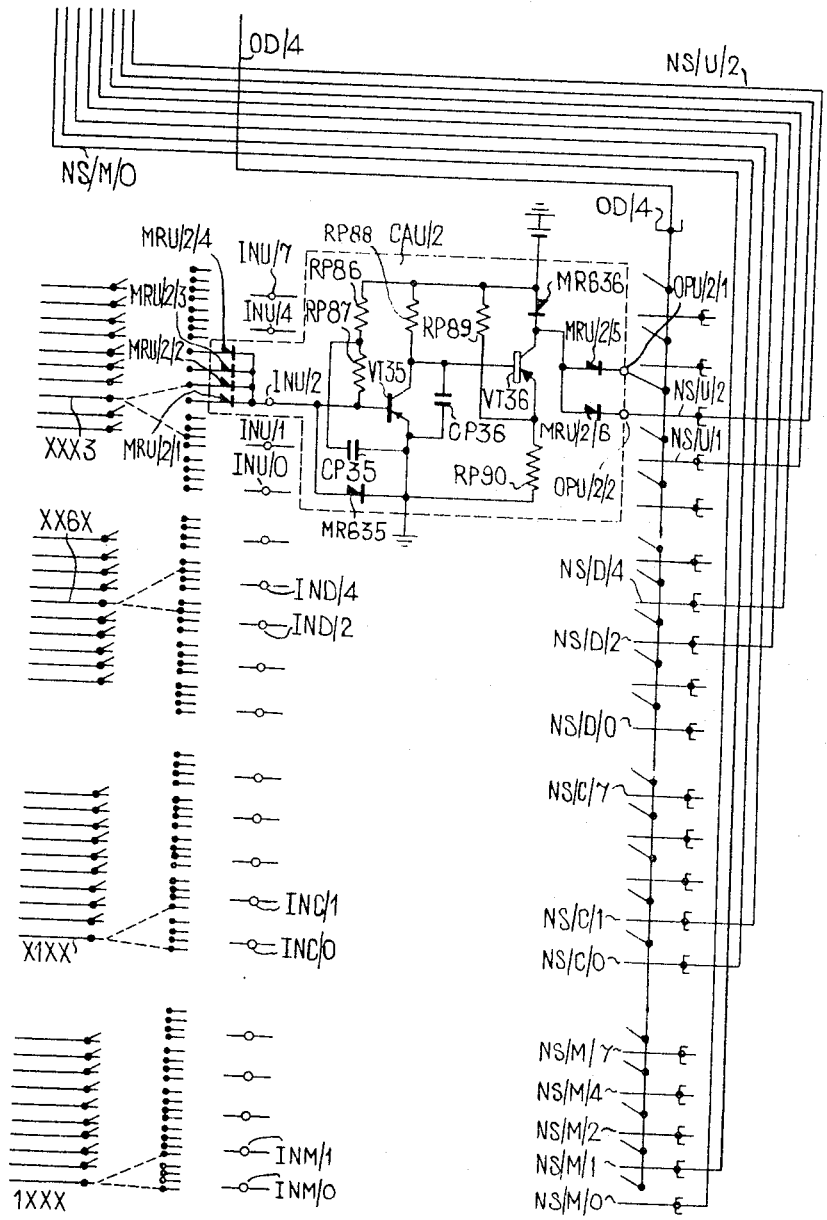
Figure 9:
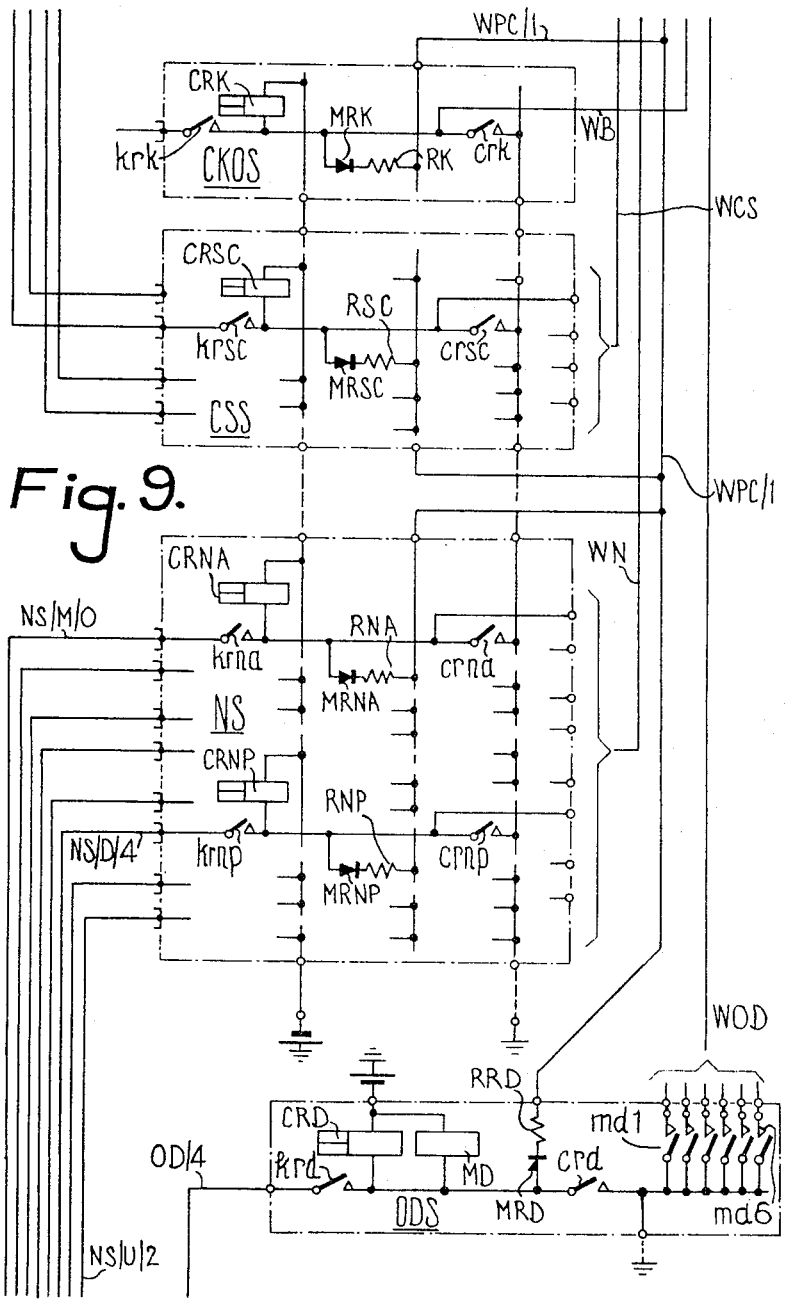
Figure 10:
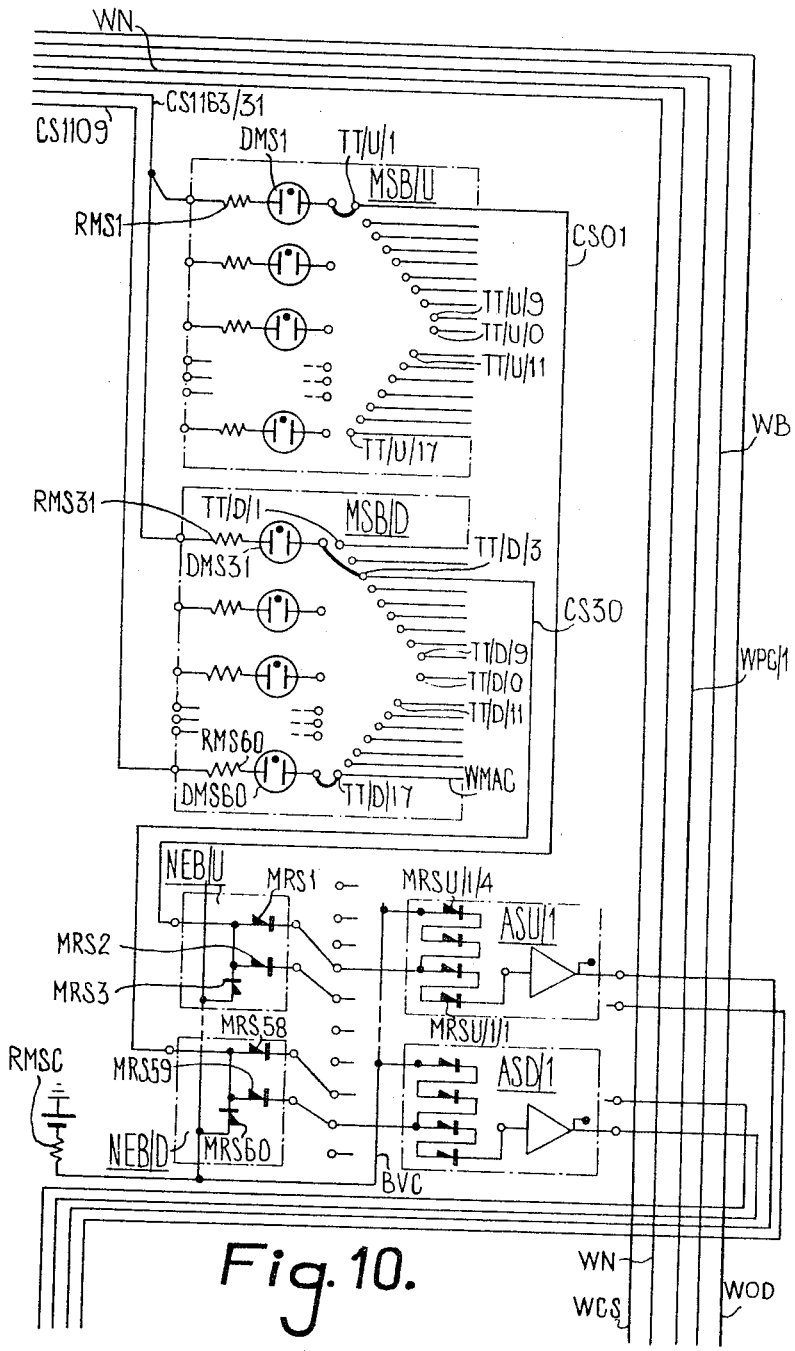
Figure 11:
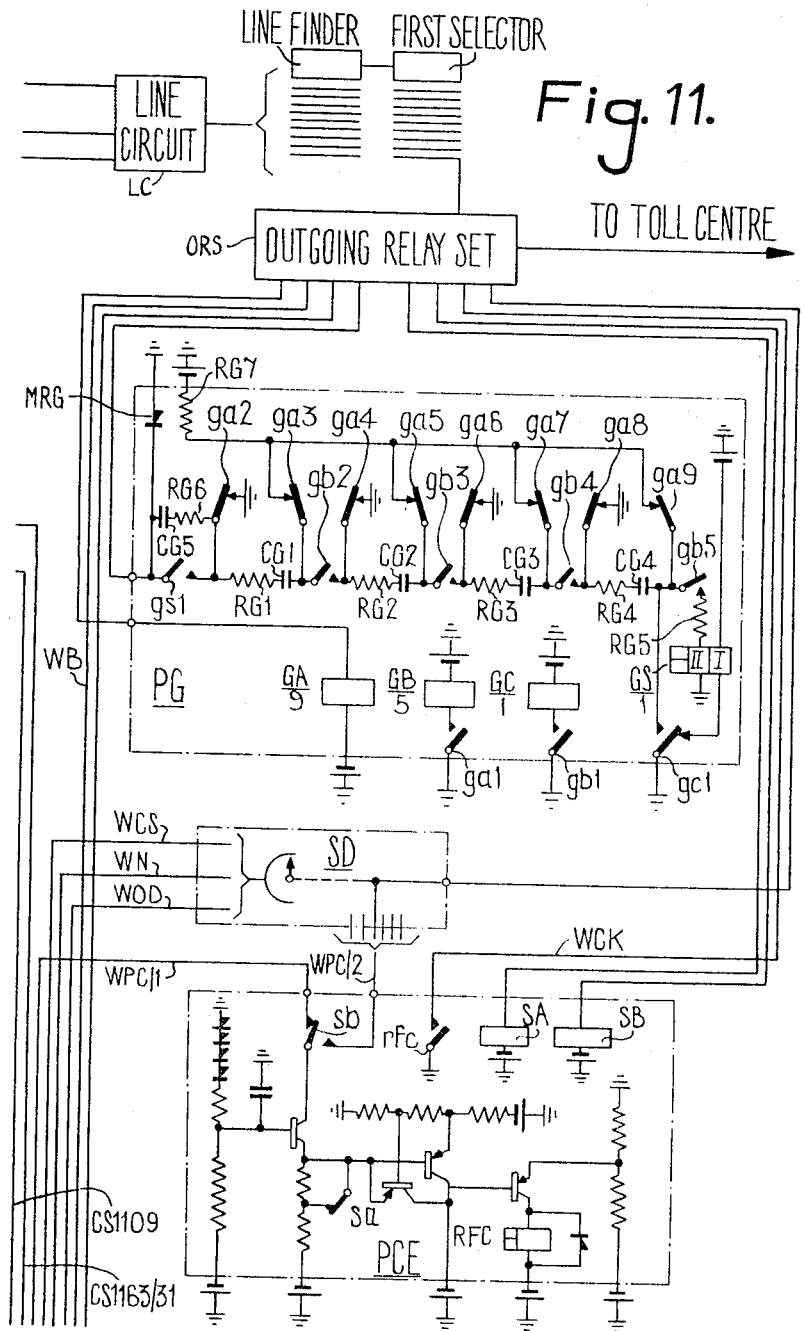

| Fig.1. | Fig.11. | |
|---|---|---|
| Fig.2. | Fig.3. | Fig.10. |
| Fig.4. | Fig.5. | Fig.9. |
| Fig.6. | Fig.7. | Fig.8. |

Fig.12.

United States Patent Office 3,280,268
Patented Oct. 18, 1966

3,280,268
ARRANGEMENTS FOR AUTOMATICALLY IDENTIFYING CALLING NUMBERS AND CLASS OF SERVICE OF CALLING LINES
Bernard Drake, London, and Harold John Sands, Beckenham, Kent, England, assignors to Associated Electrical Industries Limited, London, England, a British company
Filed July 23, 1963, Ser. No. 296,979
Claims priority, application Great Britain, Aug. 10, 1962, 30,760/62
4 Claims. (Cl. 179—18)

This invention relates to arrangements for automatically identifying calling numbers pertaining to calling lines in telephone systems, and for automatically deriving other information pertaining to such lines, and is an improvement in or modification of the invention that forms the subject of co-pending application Serial No. 168,946 filed January 26, 1962, now Patent No. 3,128,347.

In the specification of or accompanying the said co-pending application, there is described and claimed an arrangement for automatically identifying calling numbers wherein a group of thousands-hundreds conductors and a group of tens-units conductors constitute one cross-point for and corresponding to each of a plurality of four-digit decimal numbers constituting the numbers the arrangement is capable of identifying, and wherein there is, for and individual to each of these cross-points, a cross-point circuit that comprises a pair of coupling gas-filled diodes (of the cold-cathode type) and that further comprises at least two coupling resistors and that serves so to couple an input conductor, individual to a line to which the particular four-digit decimal number corresponding to the cross-point pertains, to the particular thousands-hundreds conductor and tens-units conductor forming the cross-point that so far as the particular cross-point circuit is concerned each of these two conductors forming the cross-point is normally isolated from said input conductor by a coupling gas-filled diode in the non-conducting condition and is normally isolated from the other conductor of the two by two coupling gas-filled diodes in the non-conducting condition. Each thousands-hundreds conductor is coupled over respective ones of two isolating rectifiers individual to it to a corresponding thousands-digit decimal output conductor and to a corresponding hundreds-digit decimal output conductor, and each tens-units conductor is coupled over respective ones of two isolating rectifiers individual to it to a corresponding tens-digit decimal output conductor and to a correspodning units-digit decimal output conductor, the arrangement as a whole being such that an electrical marking condition applied, for effecting identification of the calling number in respect of a call, to the particular input conductor relevant to the call, causes each coupling gas-filled diode of the appropriate cross-point circuit to conduct in series with at least one coupling resistor of this cross-point circuit and thereby produces current flow in the low-resistance direction through each of the four said isolating rectifiers pertaining to the particular thousands-hundreds conductor and tens-units conductor forming the cross-point concerned, causing an electrical marking condition to appear upon each of the relevant four decimal output conductors. For convenience in description, such an arrangement for automatically identifying calling numbers will hereinafter be referred to as a calling-number-identifying arrangement of the kind set forth.

In the particular form of calling-number-identifying arrangement of the kind set forth which is illustrated and described in detail in the prior specification referred to, each decimal output conductor is connected to a transistor amplifier, termed a pre-amplifier, that serves for amplifying the current fed to the conductor, when requisite, by way of the relevant isolating rectifier. Each of the forty pre-amplifiers concerned (ten for each of the thousands, hundreds, tens and units digit places) is connected on its output side to the relevant two amplifiers of a group of five multi-stage output amplifiers pertaining to the digit place concerned, the arrangement of the pre-amplifiers and multi-stage output amplifiers being effectively such that what is a one-out-of-ten output marking as regards the decimal output conductors and the pre-amplifiers is a two-out-of-five output conditions as regards the multi-stage output amplifiers. There are, of course, in all twenty multi-stage output amplifiers (four groups of five) connected to the forty pre-amplifiers. Each pre-amplifier comprises a single transistor, and each multi-stage output amplifier is a transistor amplifier comprising three transistors. The input impedance of each pre-amplifier includes the emitter-base resistance of the constituent transistor of the amplifier, and special provision is made to ensure that an adequate proportion of the current passing through a coupling gas-filled diode in respect of a call passes to each of the two decimal output conductors concerned despite wide differences in the characteristics of the respective pre-amplifier transistors connected to these two decimal output conductors. This special provision is made by including, in the individual circuit of the base electrode of each pre-amplifier transistor, a load resistor of a magnitude sufficient to produce the effect that the effective differential emiter-base resistance of the transistor rises materially once the transistor has bottomed. As a consequence of the inclusion of such a load resistor in the individual circuit of the base electrode of each pre-amplifier transistor, what happens when a coupling gas-filled diode becomes conducting in respect of a call is that, of the two pre-amplifier transistors respectively connected to the relevant two decimal output conductors, the one having inherently the lower emitter-base resistance takes the major proportion of the available current until it has bottomed and then, owing to the rise in the effective differential emitter-base resistance of this particular transistor once it has bottomed, the other transistor of the two obtains sufficient current also to bottom.

In a main aspect, the present invention is concerned with the provision, in a calling-number-identifying arrangement of the kind set forth, of improved transistor amplifier arrangements associated with a decimal output conductors, these improved transistor amplifier arrangements being such that twenty multi-stage output amplifiers, each conveniently a two-stage amplifier comprising two transistors, take the place of the forty pre-amplifiers and twenty multi-stage output amplifiers of the particular form of calling-number-identifying arrangement of the kind set forth which is illustrated and described in detail in the prior specification referred to.

According to a main feature of the present invention, there is provided a calling-number-identifying arrangement of the kind set forth wherein each decimal output conductor is connected to the relevant two amplifiers of a group of five multi-stage output amplifiers pertaining to the digit place concerned, the arrangement of the decimal output conductors and multi-stage output amplifiers being such that as regards each multi-stage output amplifier four decimal output conductors are connected to a common input terminal of the amplifier over respective ones of four parallel input paths each including an isolating rectifier, and that what is effectively a one-out-of-ten output marking as regards the decimal output conductors is effectively a two-out-of-five output condition as regards the multi-stage output amplifiers, and wherein each said multi-stage output amplifier is a transistor amplifier having its first (or input) stage constituted by a transistor that is normally in the conducting condition and that is brought to the cut-off condition when the relevant electrical marking condition appears upon a decimal output conductor that is connected over an isolating rectifier to the common input terminal of the amplifier.

By arranging, in accordance with this main feature, that as regards each multi-stage output amplifier concerned the first (or input) stage transistor of the amplifier is normally in the conducting condition and is brought to the cut-off condition when the relevant electrical marking condition appears upon a decimal output conductor connected to the common input terminal of the amplifier, the advantage is gained that it becomes easy to arrange that there is no material mutual interference, when a coupling gas-filled diode of the calling-number-identifying arrangement is caused to conduct in respect of a call, between the four multi-stage output amplifiers that have to be operated (as regards operation from the normal condition to the condition in which the first transistor is in the cut-off condition) by way of this diode.

According to one subordinate feature of the invention, in a calling-number-identifying arrangement according to the main feature just set forth, each said multi-stage output amplifier has a clamping rectifier connected to serve to limit the change (e.g. rise) of potential of the common input terminal of the amplifier that occurs when the relevant electrical marking condition appears upon a decimal output conductor that is connected over an isolating rectifier to this terminal. Such limitation of the change (e.g. rise of potential of the common input terminal of a multi-stage output amplifier during the identification of a calling number avoids the risk that coupling gas-filled diodes may be brought unwantedly to the conducting condition over sneak circuits during such identification.

In another aspect, the present invention provides an improved form of pulse generator for generating, as a positive unidirectional pulse of short duration and of a voltage that is high compared with the voltage of the exchange battery, the electrical marking condition applied to an input conductor (individual to a line) for effecting identification of a calling number. This improved form of pulse generator is such that, by reason of the manner in which the pulse duration is determined, this duration is independent of battery voltage and of the load on the generator.

In yet another aspect, the present invention provides improved miscellaneous-information-deriving arrangements for automatically deriving information as to the class of service under which a call is to be charged and/or other information pertaining to a call.

The previously-mentioned and other features of the invention are exemplified in the specific arrangements, concerned with automatic number identification in a telephone system and embodying the invention, which will now be described with reference to the accompanying drawings. FIGS. 1 to 11 of the drawings together constitute a single illustrative diagram (largely a circuit diagram but partly a schematic diagram) showing the general constitution and organisation of the specific arrangements referred to, and FIG. 12 is a diagram showing how FIGS. 1 to 11 should be arranged to form this single illustrative diagram.

Referring now to the illustrative diagram constituted by FIGS. 1 to 11, the arrangements shown are situated in a local exchange of a telephone area in which provision is made for the direct dialling of toll calls and for centralised automatic accounting of such calls. This local exchange is connected to a toll centre housing the necessary automatic accounting equipment. The telephone system concerned is one in which there are ordinary subscribers and special rate subscribers, there being different classes of special rate subscribers entitled to different classes of service. In order to enable the charges, in respect of a call originating at the local exchange, to be determined and registered at the toll centre, the toll centre must be informed of the called number and the number of the calling subscriber, and of the class of service under which the call is to be charged. The called number is obtained from the digits dialled by the calling subscriber. The requisite information as to the number of the calling subscriber and the class of service is obtained by automatic number identification equipment in the local exchange and is transmitted in code form to the toll centre. In the diagram constituted by FIGS. 1 to 11, most of the equipment shown is equipment concerned with the obtaining of such information and its transmission to the toll centre. Operation of the automatic number identification equipment is initiated by the toll centre immediately after all the dialled digits of the called number have been received by and stored at this centre. The toll centre equipment sets a time limit within which the automatic number identification equipment in the local exchange should provide an answer. If the time period concerned expires without an answer having been forthcoming, the automatic number identification equipment is released so far as the particular call is concerned and the call is connected through to a manual board for attention by an operator.

For the sake of simplicity, in the main the diagram constituted by FIGS. 1 to 11 only shows typical elements and conductors and connections of the automatic number identification equipment in the local exchange. This equipment comprises a calling-number-identifying arrangement for each block of ten thousand numbers pertaining to the local exchange, a miscellaneous-information-deriving arrangement, and a pool of register-senders each including or having individual to it an "office code" store such as ODS, a numerical store such as NS, a "class of service" store such as CSS, a "check operator" store such as CKOS, a pulse generator such as PG, a send distributor such as SD, and a validity checking arrangement such as PCE. So far as calling-number-identifying arrangements for blocks of ten thousand numbers are concerned, the diagram only shows typical circuit elements and conductors and connections pertaining to the calling-number-identifying arrangement for one such block. Each such block has its own "office code." These typical circuit elements, conductors, and connections appear mainly in, and almost completely constitute, FIGS. 2, 3, 4, 5, 6, 7, and 8. Typical circuit elements and connections of the miscellaneous-information-deriving arrangement, a main function of which is to obtain the requisite information as to the class of service under which a call is to be charged, are shown in FIG. 10. In making a directly dialled toll call, a subscriber connected to the local exchange (and having a line circuit such as LC), dials a special first digit (e.g. "1") as a prefix to the wanted national "number," and thereby obtains access to an outgoing relay set, such as ORS, connected to a free junction to the toll centre. This relay set transmits to the toll centre the remaining digits dialled by the calling subscriber, and then, in response to a signal from the toll centre, initiates operation of the automatic number identification equipment in the local exchange, taking into use one of the register-senders of this equipment.

Continuing to refer to the diagram constituted by FIGS. 1 to 11, at the top left of this diagram (FIG. 1) are shown certain terminals on the main distribution frame (M.D.F.) of the local exchange, and certain terminals on the intermediate distribution frame (I.D.F.) in this exchange. For each ordinary subscriber's station and each party line station and each private branch exchange line there are on the multiple side of the intermediate distribution frame (I.D.F.) a pair of speaking wire terminals such as T1163A and T1163B, or T4455A and T4455B, or T4458A and T4458B, and a private wire terminal such as T1163P, T1209P, T4455P, or T4458P. Also shown at the top left of the diagram, and represented as being effectively connected in circuit with the exchange apparatus by cross-connections carried out on the two frames referred to, are an ordinary subscriber's line shown connected through to the typical line circuit LC and pertaining to an ordinary subscriber's station S1163, an ordinary subscriber's line pertaining to an ordinary subscriber's station S1109, a party line pertaining to party line stations S1200, S1208 and S1209, and four lines L4455/1 to L4455/4 constituting a group of private branch exchange lines pertaining to a private branch exchange. These seven lines are such that their numbers all pertain to the particular block of ten thousand numbers to which the particular calling-number-identifying arrangement illustrated in the diagram pertains. Hereinafter, so far as detailed description with reference to the diagram constituted by FIGS. 1 to 11 is concerned, the expression "calling-number-identifying arrangement" will, unless the context indicates otherwise, be used to mean this particular calling-number-identifying arrangement. By reason of the fact that the seven lines illustrated at the top left of the diagram are such that their numbers all pertain to the particular block of ten thousand numbers to which this calling-number-identifying arrangement pertains, each of the illustrated private wire terminals on the multiple side of the intermediate distribution frame is connected to a corresponding input conductor, such as C1163, C1209, or C4458, of this calling-number-identifying arrangement. To avoid congestion in FIG. 1, the connection to a corresponding input conductor of the said arrangement is not shown in the case of the relevant private wire terminal for the line pertaining to station S1109. This arrangement is, when equipped to its full capacity, capable of identifying ten thousand four-digit decimal numbers, that is, capable of identifying numbers in a range 0000 to 9999. It comprises 100 thousands-hundreds conductors, of which are shown only the conductor 11XX pertaining to the combination of the thousands digit "1" and the hundreds digit "1," the conductor 12XX pertaining to the combination of the thousands digit "1" and the hundreds digit "2," the conductor 44XX pertaining to the combination of the thousands digit "4" and the hundreds digit "4," and the conductor 00XX pertaining to the combination of the thousands digit "0" and the hundreds digit "0." It further comprises 100 ten-units conductors, of which are shown only the conductor XX11 pertaining to the combination of the tens digit "1" and the units digit "1," the conductor XX55 pertaining to the combination of the tens digit "5" and the units digit "5," the conductor XX56 pertaining to the combination of the tens digit "5" and the units digit "6," the conductor XX57 pertaining to the combination of the tens digit "5" and the units digit "7," the conductor XX58 pertaining to the combination of the tens digit "5" and the units digit "8," the conductor XX63 pertaining to the combination of the tens digit "6" and the units digit 3, the conductor XX08 pertaining to the combination of the tens digit "0" and the units digit "8," the conductor XX09 pertaining to the combination of the tens digit "0" and the units digit "9," and the conductor XX00 pertaining to the combination of the tens digit "0" and the units digit "0." The thousands-hundreds and tens-units conductors constitute in effect one-cross-point for and corresponding to each of the numbers the calling-number-identifying arrangement is capable of identifying, there being a corresponding cross-point circuit for each such cross-point. The only cross-point circuits shown in the circuit diagram are the cross-point circuits M1163, M1200, M1208 and M1209 pertaining to the stations S1163, S1200, S1208 and S1209 respectively, and the cross-point circuits M4455, M4456, M4457 and M4458 pertaining to the private branch exchange lines L4455/1, L4455/2, L4455/3 and L4455/4 respectively. In order to simplify the circuit diagram, the party line shown at the top left of the circuit diagram (FIG. 1) is illustrated as having three stations, but this number of stations is only exemplary and any reasonable number of stations (on a party line) from two upwards can readily be catered for so far as the calling-number-identifying arrangement is concerned. Also for the purpose of simplifying the circuit diagram, it has been assumed that the four-digit decimal numbers peculiar to the three stations S1208, S1209 and S1200 on the party lines shown are numbers (the numbers 1208, 1209 and 1200 respectively) which are such as to involve three consecutive cross-point circuits associated with the same thousands-hundreds conductor, but it is in no way necessary that the four-digit decimal numbers pertaining to the stations on a party line should be related in this or any other way. Each cross-point circuit comprises a first coupling resistor, such as R1163V, and a first coupling gas-filled diode, such as D1163V, which are connected in series, in the order stated, between the relevant input conductor, such as C1163, and the relevant thousands-hundreds conductor, such as 11XX, and further comprises a second coupling resistor, such as R1163H, and a second coupling gas-filled diode, such as D1163H, which are connected in series, also in the order stated, between this input conductor and the relevant tens-units conductors, such as XX63. So-called neon tubes of the miniature type may be employed as the coupling gas-filled diodes. The first and second coupling resistors of a cross-point circuit may each have a resistance of 270,000 ohms. The first and second coupling gas-filled diodes of a cross-point circuit are, of course, normally in the non-conducting condition. Additionally, each of the cross-point circuits that pertain to stations on party lines is provided with an inhibiting circuit element comprising a pair of inhibiting gas-filled diodes one of which, such as N1209V, is connected between, on the one hand, the junction between the first coupling resistor and the first coupling gas-filled diode of the cross-point circuit and, on the other hand, a control wire, such as BW, common to the inhibiting circuit elements of all cross-point circuits that pertain to party line stations having the same "party identity" as the particular station concerned, and the other of which, such as N1209H, is connected between said control wire on the one hand and the junction between the second coupling resistor and the second coupling gas-filled diode of the cross-point circuit on the other hand. The inhibiting gas-filled diodes constituting such an inhibiting circuit element are, of course, normally in the non-conducting condition. A control wire as just referred to, such as the control wire BW, is normally connected to negative battery by way of the back contact of a change-over contact of a control relay, such as the back contact of change-over contact $b1$ of a control relay B, and a current-limiting resistor such as RB. Upon operation, such a change-over contact connects the control wire concerned to positive battery by way of a current-limiting resistor such as RBB. Each resistor such as RB and each resistor such as RBB may have a resistance of 200 ohms. There has to be a control wire as just referred to for each "party identity" catered for, that is, there have to be as many such wires as the maximum number of stations there may be on a party line. By way of example, three such wires, namely AW, BW, and CW, together with the corresponding control relays A, B and C with their respective change-over contacts $a1$, $b1$, and $c1$, are shown in the circuit diagram. The arrangements for operating a control relay, such as A, B, or C, when such operation is required are such that the relay is operated from or by way of the outgoing relay set, such as ORS, taken into use for the call concerned. It is arranged that a group of private branch exchange lines pertaining to a private branch exchange, such as the group comprising the four lines L4455/1 to L4455/4, in effect takes up, exclusively to itself, a series of the four-digit decimal numbers, such as the numbers 4455, 4456, 4457 and 4458, that comprises one number for each line in the group and that includes the particular-four digit decimal number, such as 4455, which is the identification number for all the lines of the group so far as calling-number identification is concerned and that is a series of consecutive numbers all having the same thousands digit and hundreds digit. The cross-point circuits, such as M4455, M4456, M4457 and M4458, pertaining to a group of private branch exchange lines are provided in the positions corresponding to the relevant series, as just referred to, of the four-digit decimal numbers, and each of these cross-point circuits is connected to the relevant thousands-hundreds conductor, such as 44XX, the same for all of them, in the same way as if the cross-point circuit pertained to an ordinary subscriber's line and is connected to the relevant tens-units conductor, such as XX55, again the same for all of them, by connections, such as the connections SC, comprising direct connections between them and made by a simple strapping operation.

The calling-number-identifying arrangement comprises ten thousands-digit decimal output conductors 1XXX to 9XXX, 0XXX, and ten hundreds-digit decimal output conductors X1XX to X9XX, X0XX, and ten tens-digit decimal output conductors XX1X to XX9X, XX0X, and ten units-digit decimal output conductors XXX1 to XXX9, XXX0. Each thousands-hundreds conductor, such as 11XX, is coupled over respective ones of two isolating rectifiers, such as MR1 and MR2, individual to it to a corresponding thousands-digit decimal output conductor and to a corresponding hundreds-digit decimal output conductor, and is also connected over a further rectifier, such as MR3, individual to it to a biasing-voltage supply conductor BVA, the connection over the further rectifier, which serves as a clamping rectifier, serving to prevent the thousands-hundreds conductor from becoming substantially more negative than the conductor BVA. A connection to negative battery over a current-limiting resistor RD2 maintains the conductor BVA at substantially minus 50 volts. The resistance of the resistor RD2 may be 200 ohms. Each tens-units conductor, such as XX63, is coupled over respective ones of two isolating rectifiers, such as MR457 and MR458, individual to it to a corresponding tens-digit decimal output conductor and to a corresponding units-digit decimal output conductor and is also connected over a further rectifier such as MR459, individual to it to a biasing-voltage supply conductor BVB, the connection over the further rectifier, which serves as a clamping rectifier, serving to prevent the tens-units conductor from becoming substantially more negative than the conductor BVB. A connection to negative battery over a current-limiting resistor RD4 of the same value as the resistor RD2 associated with the biasing-voltage supply conductor BVA maintains the conductor BVB at substantially minus 50 volts. Each decimal output conductor is connected to the relevant two amplifiers of a group of five multi-stage output amplifiers pertaining to the digit place concerned, the arrangement of the decimal output conductors and multi-stage output amplifiers being effectively such that what is a one-out-of-ten output marking as regards the decimal output conductors is a two-out-of-five output condition as regards the multi-stage output amplifiers. Of the twenty multi-stage output amplifiers (four groups of five) connected to the forty decimal output conductors, only one typical one is shown in the diagram. This typical one is the multi-stage output amplifier CAU/2 (FIG. 8) pertaining to the units digit place, and is in effect the middle amplifier of the group of five multi-stage output amplifiers CAU/0 (not shown), CAU/1 (not shown), CAU/2, CAU/4 (not shown), and CAU/7 (not shown) pertaining to this digit place. The group of five multi-stage output amplifiers pertaining to the thousands digit place comprises amplifiers CAM/0, CAM/1, CAM/2, CAM/4, and CAM/7 (none of which is shown), and the group of five multi-stage output amplifiers pertaining to the hundreds digit place comprises amplifiers CAC/0, CAC/1, CAC/2, CAC/4, and CAC/7 (none of which is shown), and the group of five multi-stage output amplifiers pertaining to the tens digit place comprises amplifiers CAD/0, CAD/1, CAD/2, CAD/4 and CAD/7 (none of which is shown). Each multi-stage output amplifier has four parallel input paths each connected to a comon input terminal, such as INU/2, of the amplifier and each including an isolating rectifier such as MRU/2/1 or MRU/2/2 or MRU/2/3 or MRU/2/4. The twenty input paths, each including an isolating rectifier, thus provided for each group of five multi-stage output amplifiers enable each decimal output conductor to be connected to the common input terminals of the relevant two amplifiers of the relevant group (to provide for the requisite conversion of a one-out-of-ten output marking into a two-out-of-five output condition) without the setting up of troublesome sneak circuits. Taking by way of example the connections between, on the one hand, the ten units-digit decimal output conductors XXX1 to XXX9, XXX0, and, on the other hand, the common input terminals of the group of five multi-stage output amplifiers CAU/0, CAU/1, CAU/2, CAU/4, and CAU/7 pertaining to the units digit place, these are as follows. The decimal output conductor XXX1 is connected over an isolating rectifier MRU/0/1 (not shown) to the common input terminal INU/0 of the amplifier CAU/0, and is connected over an isolating rectifier MRU/1/1 (not shown) to the common input terminal INU/1 of the amplifier CAU/1. The decimal output conductor XXX2 is connected over an isolating rectifier MRU/0/2 (not shown) to the common input terminal INU/0 of the amplifier CAU/0, and is connected over the isolating rectifier MRU/2/1 to the common input terminal INU/2 of the amplifier CAU/2. The decimal output conductor XXX3 is connected over an isolating rectifier MRU/1/2 (not shown) to the common input terminal INU/1 of the amplifier CAU/1, and is connected over the isolating rectifier MRU/2/2 to the common input terminal INU/2 of the amplifier CAU/2. The decimal output conductor XXX4 is connected over an isolating rectifier MRU/0/3 (not shown) to the common input terminal INU/0 of the amplifier CAU/0, and is connected over an isolating rectifier MRU/4/1 (not shown) to the common input terminal INU/4 of the amplifier CAU/4. And so on, the decimal output conductor XXX9 being connected over the isolating rectifier MRU/2/4 to the common input terminal INU/2 of the amplifier CAU/2 and over an isolating rectifier MRU/7/3 (not shown) to the common input terminal INU/7 of the amplifier CAU/7, and the decimal output conductor XXX0 being connected over an isolating rectifier MRU/4/4 (not shown) to the common input terminal INU/4 of the amplifier CAU/4 and over an isolating rectifier MRU/7/4 (not shown) to the common input terminal INU/7 of the amplifier CAU/7. Corresponding connections are, of course, made between, on the one hand, the ten thousands-digit decimal output conductors 1XXX to 9XXX, 0XXX, and, on the other hand, the common input terminals of the group of five multi-stage output amplifiers CAM/0, CAM/1, CAM/2, CAM/4, and CAM/7 pertaining to the thousands digit place, and between, on the one hand, the ten hundreds-digit decimal output conductors X1XX to X9XX, X0XX, and, on the other hand, the common input terminals of the group of five multi-stage output amplifiers CAC/0, CAC/1, CAC/2, CAC/4, and CAC/7 pertaining to the hundreds digit place, and between, on the one hand, the ten tens-digit decimal output conductors XX1X to XX9X, XX0X, and, on the other hand, the common input terminals of the group of five multi-stage output amplifiers CAD/0, CAD/1, CAD/2, CAD/4 and CAD/7 pertaining to the tens digit place. Thus, for example, the thousands-digit decimal output conductor 1XXX is connected over an isolating rectifier MRM/0/1 (not shown) to the common input terminal INM/0 of the amplifier CAM/0, and is connected over an isolating rectifier MRM/1/1 (not shown) to the common input terminal INM/1 of the amplifier CAM/1. To take another example, the hundreds-digit decimal output conductor X1XX is connected over an isolating rectifier MRC/0/1 (not shown) to the common input terminal INC/0 of the amplifier CAC/0, and is connected over an isolating rectifier MRC/1/1 (not shown) to the common input terminal INC/1 of the amplifier CAC/1. To take yet another example, the tens-digit decimal output conductor XX6X is connected over an isolating rectifier MRD/2/3 (not shown) to the common input terminal IND/2 of the amplifier CAD/2, and is connected over an isolating rectifier MRD/4/3 (not shown) to the common input terminal IND/4 of the amplifier CAD/4.

Each multi-stage output amplifier comprises a first transistor such as VT35, a second transistor such as VT36, a first input resistor such as RP86, a second input resistor such as RP87, a decoupling capacitor such as CP35, a first clamping rectifier such as MR635, a coupling resistor such as RP88, a delay capacitor such as CP36, a first feeding resistor such as RP89, a second feeding resistor such as RP90, a second clamping rectifier such as MR636, a first output rectifier such as MRU/2/5, and a second output rectifier such as MRU/2/6. Each such amplifier has a first output terminal such as OPU/2/1, and a second output terminal such as OPU/22. The first transistor, such as VT35, of each multi-stage output amplifier may be of a low-level silicon type, and the second transistor, such as VT36, may be of a high-voltage germanium type. The first input resistor, such as RP86, and the second input resistor, such as RP87, of each multi-stage output amplifier may each have a resistance of 560,000 ohms. The coupling resistor, such as RP88, and the first feeding resistor, such as RP89, and the second feeding resistor, such as RP90, of each multi-stage output amplifier may have resistances of 82,000 ohms, and 27,000 ohms, and 390 ohms respectively. The decoupling capacitor, such as CP35, and the delay capacitor, such as CP36, of each multi-stage output amplifier may have capacities of 0.01 microfarad and 0.015 microfarad respectively.

The common input terminal, such as INU/2, of a multi-stage output amplifier is directly connected to the base of the first transistor, such as VT35, of the amplifier. This transistor is normally in the conducting condition by reason of the connection of its base to negative battery over the first and second input resistors, such as RP86 and RP87, of the amplifier. With the first transistor normally in the conducting condition, the second transistor, such as VT36, of the amplifier is normally maintained in the cut-off condition as a result of the voltage drop across the coupling resistor, such as RP88, of the amplifier. When the relevant electrical marking condition, namely a positive unidirectional pulse of short duration and of a voltage that is high compared with the voltage of the exchange battery, apears upon a decimal output conductor, such as XXX3, which is connected over an isloating rectifier, such as MRU/2/2, to the common input terminal of the amplifier, it brings the first transistor of the amplifier to the cut-off condition for a short period. This causes the collector of this first transistor, and hence the base of the second transistor of the amplifier, to become for a short period more negative to a degree sufficient to cause the second transistor to assume the conducting condition for a short period and produce a positive-going output condition at the output terminals, such as OPU2/1 and OPU/2/2, of the amplifier. The decoupling capacitor, such as CP35, of the amplifier serves, in conjunction with the first input resistor thereof, to make the "just operate" input level of the amplifier (as regards operation from the normal condition to the condition in which the first transistor is in the cut-off condition and the second transistor is conducting) substantially independent of surges on the battery supply. The delay capacitor, such as CP36, and the coupling resistor, such as RP88, of the amplifier form in conjunction a resistance-capacity combination that serves to delay somewhat the bringing of the second transistor of the amplifier to the conducting condition when the first transistor is brought to the cut-off condition. The delay is very short (for example 0.2 milli second), but suffices to render the amplifier substantially immune from false effective operation by inductive disturbances. The first clamping rectifier, such as MR635, of the amplifier is connected to serve to limit the rise of potential of the common input terminal, such as INU/2, that occurs when the relevant electrical marking condition appears upon a decimal output conductor, such as XXX3, which is connected over an isolating rectifier, such as MRU/2/2, to this terminal. The limitation of the rise of potential of the common input terminal is effectively, of course, a limitation to a rise to earth potential. Such limitation of the rise of potential of the common input terminal of the amplifier during the identification of a calling number avoids the risk that coupling gas-filled diodes may be brought unwantedly to the conducting condition over sneak circuits during such identification, and does this without mutual interference between the amplifier and the other three multi-stage output amplifiers that have to be operated (as regards operation from the normal condition to the condition in which the first transistor is in the cut-off condition and the second transistor is conducting) by way of the same coupling gas-filled diode in effecting such identification.

The "office code" store, such as ODS (FIG. 9) included in or individual to a register-sender of the automatic number identification equipment comprises one storage relay, such as CRD and conveniently of the reed type, and one auxiliary storage relay, such as MD, for each block of ten thousand numbers pertaining to the local exchange or, in effect, for each calling-number-identifying arrangement, such as the one illustrated in the diagram, in this exchange. In the diagram, only the one typical storage relay CRD and the one typical auxiliary storage relay MD are shown in the "office code" store ODS. These two relays pertain to the particular block of ten thousand numbers to which the particular calling-number-identifying arrangement illustrated in the diagram pertains.

The numerical store, such as NS (FIG. 9), included in or individual to a register-sender of the automatic number identification equipment comprises twenty storage relays (conveniently of the reed type) constituting four sets of five relays for registering, on a two-out-of-five code basis, the four digits of the four-digit numerical number of a calling subscriber. In the diagram, only two typical storage relays CRNA and CRNP are shown in the numerical store NS, the storage relay CRNA being the first or "0" relay in the set of five pertaining to the thousands digit place, and the storage relay CRNP being the fourth or "4" relay in the set of five pertaining to the tens digit place.

The first output terminal, such as OPU/2/1, of a multi-stage output amplifier is connected to provide (in conjunction with the seven other multi-stage output amplifiers that happen to be concerned in any particular case) for the operation of the relevant storage relay, such as CRD, in the relevant "office code" store, such as ODS, upon the operation of the amplifier (as regards operation from the normal condition to the condition in which the first transistor is in the cut-off condition and the second transistor is conducting). The relevant "office code" store in any particular case is, of course, the one included in or individual to that particular register-sender, of the pool of register-senders included in the automatic number identification equipment in the local exchange, that is taken into use for the call in respect of which the amplifier is operated, and that accordingly is coupled, as a consequence of the closing of over thirty coupling contacts such as *krd*, *krna*, *krnp*, *krsc*, and *krk* (FIG. 9), to the calling-number-identifying arrangements for the blocks of ten thousand numbers and to the miscellaneous-information-deriving arrangement. In any particular case, the relevant storage relay in the relevant "office code" store is, of course, the particular storage relay, of those in this relevant store, that pertains to the particular block of ten thousand numbers to which the amplifier pertains. In the case, for example, of the twenty multi-stage output amplifiers, such as CAU/2, of the calling-number-identifying arrangement illustrated in the diagram, the first output terminals of the twenty amplifiers are all connected in common to a signalling wire OD/4 that is connected to provide for the operation, when requisite, of the storage relay, such as CRD, pertaining to this particular calling-number-identifying arrangement in the "office code" store included in or individual to any register-sender of the pool of register-senders.

The second output terminal, such as OPU/2/2, of a multi-stage output amplifier is connected to provide for the operation of the relevant storage relay in the relevant numerical store, such as NS, upon the operation of the amplifier (as regards operation from the normal condition to the condition in which the first transistor is in the cut-off condition and the second transistor is conducting). The relevant numerical store in any particular case is, of course, the one included in or individual to that particular register-sender, of the pool of register-senders included in the automatic number identification equipment in the local exchange, that is taken into use for the call in respect of which the amplifier is operated. In any particular case, the relevant storage relay in the relevant numerical store is, of course, the particular storage relay, of those in this relevant store, that pertains to the same digit place as the amplifier and that has the same numerical significance as the amplifier in regard to values of the digit of this digit place. In the case, for example, of the amplifier CAM/0 (not shown) included in the calling-number-identifying arrangement illustrated in the diagram, which amplifier is the first or "0" amplifier of the group of five pertaining to the thousands digit place, the second output terminal of the amplifier is connected to a signalling wire NS/M/0 that is connected to provide for the operation, when requisite, of the storage relay, such as CRNA, that is the first or "0" relay in the set of five pertaining to the thousands digit place in the numerical store included in or individual to any register-sender of the pool of register-senders. To take another example, in the case of the amplifier CAD/4 (not shown) included in the calling-number-identifying arrangement illustrated in the diagram, which amplifier is the fourth or "4" amplifier of the group of five pertaining to the tens digit place, the second output terminal of the amplifier is connected to a signalling wire NS/D/4 that is connected to provide for the operation, when requisite, of the storage relay, such as CRNP, that is the fourth or "4" relay in the set of five pertaining to the tens digit place in the numerical store included in or individual to any register-sender of the pool of register-senders.

The pulse generator, such as PG (FIG. 11), included in or individual to a register-sender of the automatic number identification equipment comprises four pulse-generating capacitors such as CG1 to CG4, a spark-quenching capacitor such as CG5, a first sequence relay such as GA, a second sequence relay such as GB, a third sequence relay such as GC, a pulse-timing relay such as GS, a rectifier such as MRG, four protective resistors such as RG1 to RG4, a timing resistor such as RG5, a spark-quenching resistor such as RG6, and a charging resistor such as RG7. The third sequence relay, such as GC, is of a type which is slightly slugged to inhibit contact bounce on closure of a front contact. The pulse-timing relay, such as GS, is of the high-speed type. The four pulse-generating capacitors, such as CG1 to CG4, may each have a capacity of 500 microfarads, and the spark-quenching capacitor, such as CG5, may have a capacity of 2 microfarads. The four protective resistors, such as RG1 to RG4, may each have a resistance of 6.8 ohms, and the timing resistor, such as RG5, the spark-quenching resistor such as RG6, and the charging resistor such as RG7 may have resistances of 5000 ohms, 100 ohms, and 20 ohms respectively.

In the normal condition of the pulse generator PG, the pulse-timing relay GS is maintained in the operated condition on its winding (I) in a circuit over back contact $gc1$, the energisation of this winding being such as to saturate the relay. Also, in the normal condition of the pulse generator PG, each of the four pulse-generating capacitors CG1 to CG4 is maintained in a charged condition in which it is charged to the voltage of the exchange battery, the potential of its right-hand terminal or lead (as seen in the diagram) being 50 volts negative with respect to its other terminal or lead, which is at earth potential. The charging circuit for each of the four pulse-generating capacitors includes a break contact, $ga2$ or $ga4$ or $ga6$ or $ga8$, of the first sequence relay, a protective resistor RG1 or RG2 or RG3 or RG4, a further break contact, $ga3$ or $ga5$ or $ga7$ or $ga9$, of the first sequence relay, and the charging resistor RG7. When the pulse generator PG is required to generate the previously-mentioned relevant electrical marking condition, namely a positive unidirectional pulse of short duration and of a voltage that is high compared with the voltage of the exchange battery, for effecting calling number identification in respect of a call for which the register-sender concerned is taken into use, the first sequence relay GA of the generator is operated from the relevant outgoing relay set such as ORS. For the time being, holding relays connected to the through private wire to which the pulse is to be applied are held by earth over the rectifier MRG of the pulse generator. Upon operation, the first sequence relay at its break contacts $ga2$ to $ga9$ opens the normal connections of the pulse-generating capacitors CG1 to CG4 to earth and negative battery, and at a make contact $ga1$ operates the second sequence relay GB. Upon its operation in turn, the second sequence relay at three make contacts $gb2$, $gb3$ and $gb4$ connects the four charged pulse-generating capacitors in series in series-aiding relationship so far as their voltages are concerned, and at a further make contact $gb1$ operates the third sequence relay GC, and at a still further make contact $gb5$ prepares a circuit, including the timing resistor RG5, for winding (II) of the pulse-timing relay GS. The preparation of the circuit for winding (II) of relay GS gives rise to the flow of a slight discharge current from the series-connected charged pulse-generating capacitors, but this current is of too low a magnitude for it to have any material effect in regard to the operation of the pulse generator. Upon operation, the third sequence relay GC at its contact $gc1$ opens the circuit of winding (I) of the pulse-timing relay GS, and connects earth to that end of the series circuit comprising the charged pulse-generating capacitors that is remote from the through private wire to which the pulse is to be applied. Such connection of earth generates the pulse by causing discharge current to flow from the four pulse-generating capacitors to said through private wire by way of the make contact $gs1$ of the pulse-timing relay. Such connection of earth also completes the prepared circuit for winding (II) of the pulse-timing relay GS, which upon completion is effectively a circuit in which the winding (II) is shunted by the timing resistor RG5. The pulse-timing relay GS releases with a lag which is accurately determined by the value of the timing resistor RG5. When relay GS releases at the end of this lag, the opening of its contact $gs1$ terminates the pulse generated and applied to the through private wire concerned. The voltage of the pulse is, of course, substantially 200 volts, and is arranged to have a duration of the order of 1.5 to 2.0 milliseconds. By reason of the manner in which the pulse duration is determined, this duration is independent of battery voltage and of the load on the generator. The spark-quenching resistance-capacitance combination constituted by the spark-quenching resistor RG6 and the spark-quenching capacitor CG5, although effective to prevent undesirable sparking at contact $gs1$ when this contact opens to terminate the pulse generated, introduces only a very small lag (for example 0.2 millisecond) in the effective termination of the pulse.

Taking by way of example the case where calling-number identification is required in respect of a call originating from the ordinary subscriber's station S1163, the carrying out of such identification involves in sequence (i) the taking into use of one of the register-senders of the automatic number identification equipment from the outgoing relay set, such as ORS, used on the call (ii) the coupling of this register-sender to the calling-number-identifying arrangements for the blocks of ten thousand numbers if or as soon as these arrangements are free and available for use on the call, and (iii) the application of the relevant electrical marking condition to the input conductor C1163, the marking condition being transmitted to this input conductor from the pulse generator, such as PG, concerned by way of the outgoing relay set and a through private wire set up for the call concerned and being, of course, a positive unidirectional pulse of the kind produced by such a pulse generator as already described. This positive pulse causes the coupling gas-filled diodes D1163V and D1163H of the cross-point circuit M1163 to conduct, in series with the respective coupling resistors R1163V and R1163H, for the effective duration of the pulse, and thereby produces current flow in the low-resistance direction through each of the four isolating rectifiers MR1, MR2, MR457, and MR458 pertaining to the particular thousands-hundreds conductor and tens-units conductor forming the cross-point concerned, causing an electrical marking condition to appear upon each of the relevant four decimal output conductors 1XXX, X1XX, XX6X, and XXX3. As will be clear from what has already been said, the effect of this is to bring about the operation of the relevant eight multi-stage output amplifiers to cause, so far as numerical number registration is concerned, the four digits of the four-digit decimal number "1163" (the number to be identified) to be signalled, on a two-out-of-five code basis, to the numerical store, such as NS, that is included in or individual to the register-sender concerned and that is accordingly coupled to the calling-number-identifying arrangement. In the exemplary case now being considered, the relevant eight multi-stage output amplifiers are the amplifiers, CAM/0, CAM/1, CAC/0, CAC/1, CAD/2, CAD/4, CAU/1, and CAU/2 (of which only CAU/2 is shown). Assuming, for ease of description, that in this exemplary case the "office code" and numerical stores concerned are the stores ODS and NS respectively, then the operation of the eight multi-stage output amplifiers, which gives rise to a positive-going output condition at the output terminals of these amplifiers, brings about the operation of storage relay CRD in store ODS and the operation of eight storage relays in store NS. Upon the operation of storage relay CRD, which is effected over wire OD/4 and coupling contact krd in its operated (closed) condition, the relay locks up over its contact crd to a temporarily-applied holding earth. The corresponding auxiliary storage relay MD then operates in parallel with relay CRD in the circuit over contact crd, and at its contacts md1 to md6 extends three pairs of markings from the holding earth just mentioned to mark three pairs of wires of a group of wires represented by the line WOD, the particular six wires concerned being such that the extension of the holding earth to them signifies, on a two-out-of-five code basis as regards each of three "office digits," the identity of the block of ten thousand numbers or "office" concerned, i.e. the "office code" (e.g. GA5 for the "Garden 5" office) concerned. The extension of the holding earth to the relevant six of the group of wires represented by the line WOD provides for the marking of the send distributor SD of the register sender concerned to enable this distributor to send, in due course and proper sequence, the "office digit" stored in store ODS to the outgoing relay set for onward transmission to the toll centre. The eight storage relays operated in the numerical store NS are the relay CRNA, which is operated from the amplifier CAM/0 by way of the signalling wire NS/M/0, a relay CRNB (not shown), which is operated from the amplifier CAM/1 by way of the signalling wire NS/M/1, a relay CRNF (not shown), which is operated from the amplifier CAC/0 by way of the signalling wire NS/C/0, a relay CRNG (not shown), which is operated from the amplifier CAC/1 by way of the signalling wire NS/C/1, a relay CRNN (not shown), which is operated from the amplifier CAD/2 by way of the signalling wire NS/D/2, the relay CRNP, which is operated from the amplifier CAD/4 by way of the signalling wire NS/D/4, a relay CRNS (not shown), which is operated from the amplifier CAU/1 by way of the signalling wire NS/U/1, and a relay CRNT (not shown), which is operated from the amplifier CAU/2 by way of the signalling wire NS/U/2. Upon operation, each of the eight operated storage relays in store NS locks up over its contact, such as crna or crnp, to the temporarily-applied holding earth, and by the closing of this contact extends this holding earth to the one that corresponds to the relay of a group of twenty wires represented by the line WN. This group of twenty wires comprises five wires for each of the thousands, hundreds, tens, and units digit places, and the extension of the holding earth to the eight of these wires that correspond to the eight storage relays operated in the numerical store NS provides for the marking of the send distributor SD of the register-sender concerned to enable this distributor to send, in due course and proper sequence, the digits stored in store NS to the outgoing relay set for onward transmission to the toll centre.

Taking by way of further example the case where calling-number identification is required in respect of a call originating from the party line station S1209, the carrying out of such identification involves the application, at the proper time in the sequence of operations concerned, of a positive unidirectional pulse of the kind produced by a pulse generator such as PG to the input conductors C1208, C1209, and C1200, all these input conductors being involved since they are cross-connected on the intermediate distribution frame (I.D.F.) to the same private wire terminal TT on this frame, with the consequence that the pulse on being transmitted over the through private wire concerned reaches all of them. The carrying out of such identification further involves the operation, for a period covering the period of duration of the positive unidirectional pulse, of the control relay corresponding to the "party identity" of the particular party line station concerned, the particular control relay concerned in the present case being relay B. As will appear from what has already been stated, the control relay concerned is operated from or by way of the outgoing relay set, such as ORS, taken into use for the call. The positive unidirectional pulse causes the inhibiting gas filled diodes N1200V and N1200H of the inhibiting circuit element of the cross-point circuit M1200 to conduct with the consequence that the pulse is rendered ineffective so far as bringing the coupling gas-filled diodes D1200V and D1200H of this cross-point circuit to the conducting condition is concerned. The circuit in which the diodes N1200V and N1200H are caused to conduct includes, of course, the contact a1 in its unoperated condition and resistor RA. The positive unidirectional pulse further causes the inhibiting gas-filled diodes N1208V and N1208H of the inhibiting circuit element of the cross-point circuit M1208 to conduct with the consequence that the pulse is rendered ineffective so far as bringing the coupling gas-filled diodes D1208V and D1208H of this cross-point circuit to the conducting condition is concerned, the circuit in which the diodes N1208V and N1208H are caused to conduct being one including the contact c1 in its unoperated condition and resistor RC. Since in the circumstances being considered the contact b1 is operated, the inhibiting circuit element of the cross-point circuit M1209 is disabled by reason of the connection of the control wire BW to positive battery by way of resistor RBB. Accordingly, the positive unidirectional pulse causes the coupling gas-filled diodes D1209V and D1209H of the last-mentioned cross-point circuit to conduct for the effective duration of the pulse, and thereby produces current flow in the low-resistance direction through each of the four isolating rectifiers MR4, MR5, MR595 and MR596 pertaining to the particular thousands-hundreds conductor and tens-units conductor forming the cross-point concerned, causing an electrical marking condition to appear upon each of the relevant four decimal output conductors. As will be clear, the effect of this is to bring about the operation of the relevant eight multi-stage output amplifiers to cause, so far as numerical number registration is concerned, the four digits of the four-digit decimal number "1209" (the number to be identified) to be signalled, on a two-out-of-five code basis, to the numerical store, such as NS, that is included in or individual to the register-sender concerned and that is accordingly coupled to the calling-number-identifying arrangement.

Taking by way of still further example of the case where calling-number identification is required in respect of a call originating at a station on the private branch exchange to which the four lines L4455/1 to L4455/4 pertain, the particular one of these four lines that is concerned being the line L4455/4, the carrying out of such identification involves the application, at the proper time in the sequence of operations concerned, of a positive unidirectional pulse of the kind produced by a pulse generator such as PG to the input conductor C4458. This positive pulse causes the coupling gas-filled diodes D4458V and D4458H of the cross-point circuit M4458 to conduct for the effective duration of the pulse, and thereby produces current flow in the low-resistance direction through the two isolating rectifiers MR100 and MR101 pertaining to the particular thousands-hundreds conductor (the conductor 44XX) involved in the formation of the cross-point concerned, and through the isolating rectifiers MR433 and MR434 pertaining to the particular tens-units conductor (the conductor XX55) to which the coupling gas-filled diode D4458H is connected by the connections SC, causing an electrical marking condition to appear upon each of the relevant four decimal output conductors. As will be clear, the effect of this is to bring about the operation of the relevant eight multi-stage output amplifiers to cause, so far as numerical number registration is concerned, the four digits of the four-digit decimal number "4455" (the number to be identified) to be signalled, on a two-out-of-five code basis, to the numerical store, such as NS, that is included in or individual to the register-sender concerned and that is accordingly coupled to the calling-number-identifying arrangement.

As already stated, the automatic number identification equipment in the local exchange includes a miscellaneous-information-deriving arrangement of which typical circuit elements and connections are shown in FIG. 10, and a main function of which is to obtain the requisite information as to the class of service under which a call is to be charged. This arrangement comprises an input conductor, such as CS1163/31 or CS1109, for and corresponding to each line or station with which it is concerned, and, for and corresponding to each such input conductor, at least one coupling circuit comprising a coupling resistor, such as RMS1 or RMS31 or RMS60, and a coupling gas-filled diode, such as DMS1 or DMS31 or DMS60, which are connected in series between the input conductor and a signalling wire, such as CS01 or CS30 or WMAC, of the arrangement. The coupling resistors and coupling gas-filled diodes of the coupling circuits just mentioned are mounted on miscellaneous service boards, such as MSB/U and MSB/D, each adapted to accommodate the components of thirty such circuits. Each of these boards is furnished with output terminals, such as TT/U/1 to TT/U/17, or TT/D/1 to TT/D/17, to which signalling wires are connected as appropriate, and to which coupling circuits having their components mounted on the board concerned can be connected as appropriate by straps, to effect the connection of these circuits to signalling wires as is requisite to meet the requirements of the particular local exchange. The miscellaneous-information-deriving arrangement further comprises rectifier-mounting boards, such as NEB/U and NEB/D, on which are mounted rectifiers involved in the coupling, without the setting up of troublesome sneak circuits, of signalling wires such as CS01 and CS30 and WMAC to respective relevant pairs of amplifiers or single amplifiers, as the case may be, of a plurality of multi-stage output amplifiers included in the arrangement. The particular multi-stage output amplifiers to which signalling wires such as CS01 and CS30 are coupled are amplifiers concerned with the operation of storage relays in the "class of service" stores such as CSS. In general, a two-digit decimal number, which may conveniently be looked upon as comprising a tens digit and a units digit, is used for transmitting to the toll centre information as to the class of service under which a call is to be charged. Accordingly, the "class of service" store, such as CSS, included in or individual to a register-sender of the automatic number identification equipment comprises ten storage relays (conveniently of the reed type) constituting two sets of five relays for registering, on a two-out-of-five code basis, the two digits of such a number, and the multi-stage output amplifiers included in the miscellaneous-information-deriving arrangement include two coresponding sets of five amplifiers. In the diagram, only one typical storage relay CRSC is shown in the "class of service" store CSS, this being the third or "2" relay in the set of five pertaining to the tens digit place of the two-digit decimal numbers concerned. Of the ten amplifiers constituting the two sets of five just mentioned, only two typical ones are shown in the diagram, namely the multi-stage output amplifier ASU/1 and the multi-stage output amplifier ASD/1. The amplifier ASU/1 pertains to the units digit place of the two-digit decimal numbers concerned, and is the second or "1" amplifier of the set of five multi-stage output amplifiers ASU/0 (not shown), ASU/1, ASU/2 (not shown), ASU/4 (not shown), and ASU/7 (not shown) pertaining to this digit place. The amplifier ASD/1 pertains to the tens digit place of the two-digit decimal numbers concerned, and is the second or "1" amplifier of the set of five multi-stage output amplifiers ASD/0 (not shown), ASD/1, ASD/2 (not shown), ASD/4 (not shown), and ASD/7 (not shown) pertaining to this digit place. In addition to the two sets of five amplifiers just referred to, the plurality of multi-stage output amplifiers included in the miscellaneous-information-deriving arrangement includes further amplifiers (not shown) for effecting operations such as the operation of the storage relay in a "check operator" store such as CKOS. The provision and connections of the rectifiers on the rectifier-mounting boards such as NEB/U and NEB/D are such that a signalling wire such as CS01 or CS30 is coupled over respective ones of a pair of isolating rectifiers, such as the pair MRS1 and MRS2 or the pair MRS58 and MRS59, individual to it to the relevant pair of multi-stage output amplifiers, and is also connected over a further rectifier, such as MRS3 or MRS60, individual to it to a biasing-voltage supply conductor BVC, the connection over the further rectifier, which serves as a clamping rectifier, serving to prevent the signalling wire from becoming substantially more negative than the conductor BVC. A connection to negative battery over a current-limiting resistor RMSC maintains the conductor BVC at substantially minus 50 volts. The resistance of the resistor RMSC may be 200 ohms. Each multi-stage output amplifier of the miscellaneous-information-deriving arrangement is an amplifier of the same kind as the amplifier CAU/2, but has only one output terminal connected to a signalling wire and has the four rectifiers (such as MRSU/1/1 to MRSU/1/4, FIG. 10) associated with its input terminal connected in series between the biasing-voltage supply conductor BVC and this terminal, the input connection from the relevant isolating rectifier, such as MRS1, on a rectifier-mounting board being taken to the junction between the second and third of the four rectifiers.

By way of example, the diagram shows connections made whereby a "class of service" indication, in the form of the two-digit decimal number "31," is transmitted to the toll centre when calling-number identification is carried out in respect of a call originating from the ordinary subscriber's station S1163. These connections are such that when, for the purposes of calling-number identification in respect of such a call, the positive unidirectional pulse is transmitted by way of the outgoing relay set, such as ORS, concerned, the pulse reaches the input conductor CS1163/31 as well as reaching the input conductor C1163. The appearance of the positive pulse on the input conductor CS1163/31 causes the coupling gas-filled diodes DMS1 and DMS31 to conduct, in series with the respective coupling resistors RMS1 and RMS31, for the effective duration of the pulse, and thereby produces current flow in the low-resistance direction through each of the four isolating rectifiers MRS1, MRS2, MRS58, and MRS59, causing the operation of the relevant four multi-stage output amplifiers of the miscellaneous-information- deriving arrangement. These four amplifiers are, of course, the four that have to be operated to cause the two digits of the two-digit decimal number "31" to be signalled, on a two-out-of-five code basis, to the "class of service" store, such as CSS, that is included in or individual to the register-sender concerned, and are accordingly the amplifiers ASD/1, ASD/2, ASU/0, and ASU/1. Assuming, for ease of description, that in the case of the call now being considered the "class of service" store concerned is the store CSS, then the operation of the four amplifiers brings about the operation of four storage relays in store CSS. These four relays are a relay CRSB (not shown), which is operated from the amplifier ASD/1, the relay CRSC, which is operated from the amplifier ASD/2, a relay CRSL (not shown), which is operated from the amplifier ASU/0, and a relay CRSM (not shown), which is operated from the amplifier ASU/1. Upon operation, each of the four operated relays in store CSS locks up over its contact, such as *crsc*, to the temporarily-applied holding earth, and by the closing of this contact extends this holding earth to the one that corresponds to the relay of a group of ten wires represented by the line WCS. This group of ten wires comprises five wires for each of the tens and units digit places of the two-digit decimal numbers used for transmitting to the toll centre information as to class of service, and the extension of the holding earth to the four of these wires that correspond to the four storage relays operated in the "class of service" store CSS provides for the marking of the send distributor SD of the register-sender concerned to enable this distributor to send, in due course and proper sequence, the digits stored in store CSS to the outgoing relay set for repetition (by this relay set) to the toll centre.

The "check operator" store, such as CKOS (FIG. 9), included in or individual to a register-sender of the automatic number identification equipment comprises a single storage relay, such as CRK and conveniently of the reed type. The operation, when calling-number identification is carried out in respect of a call, of the storage relay in the "check operator" store pertaining to the register-sender taken into use for the call signifies that the call is such that the sending of a signal to the toll centre to cause the call to be connected through to a manual board for operator identification by a so-called check operator is required. Such a call may for example be one in which the calling subscriber is for some reason not identifiable by the automatic number identification equipment (for example is a subscriber on a multi-party line in respect of which no means are provided for automatically identifying the calling subscriber of a call from the line). By way of example, the diagram shows connections made whereby a signal signifying that the call is to be routed through to a manual board for attention by an operator is transmitted to the toll centre when calling-number identification is carried out in respect of a call originating from the ordinary subscriber's station S1109. These connections are such that when, as a consequence of the initiation of the ordinary calling-number identification operations in respect of a call originating from this station, the positive unidirectional pulse is transmitted by way of the outgoing relay set, such as ORS, concerned, the pulse reaches the input conductor CS1109 of the miscellaneous-information-deriving arrangement. The appearance of the positive pulse on the input conductor CS1109 causes the coupling gas-filled diode DMS60 to conduct, in series with the coupling resistor RSM60, for the effective duration of the pulse, and thereby causes the operation of a multi-stage output amplifier (not shown) coupled to the signalling wire WMAC and included in the miscellaneous-information-deriving arrangement. This amplifier is, of course, the one that has to be operated to effect the operation of the single storage relay of the "check operator" store, such as CKOS, that is included in or individual to the register-sender concerned. Assuming, for ease of description, that in the case of the call now being considered the "check operator" store concerned is the store CKOS, then the operation of the amplifier brings about the operation of the storage relay CRK, which on this assumption is coupled to the amplifier over operated contact *krk*. Upon operation, relay CRK locks up over its contact *crk* to the temporarily-applied holding earth, and by the closing of this contact extends this holding earth to the wire WB and thence to the outgoing relay set, causing the requisite signal to be sent to the toll centre to cause the call to be connected through to a manual board for attention by an operator.

The constitution and organisation of the validity checking arangement, such as PCE (FIG. 11), included in or individual to a register-sender of the automatic number identification equipment fall within the ambit of co-pending application Serial No. 254,271, filed the 28th January 1963, and do not form part of the present invention.

Briefly, a validity checking arrangement such as PCE serves as follows. As soon as the calling-number-identifying arrangement for the block of ten thousand numbers concerned and the miscellaneous-information-deriving arrangement have performed their functions in respect of a call (i.e. have effected the operation and locking up of a storage relay or relays) they are released to free them for use on other calls, the stores of the register-sender concerned being uncoupled from them be the opening of the relevant coupling contacts such as *krd*, *krna*, *krnp*, *krsc*, and *krk* (FIG. 9). The validity checking arrangement, such as PCE, pertaining to this register-sender is then brought into use on the call by the completion of a testing circuit adapted to respond to the closed condition of a contact of an output signal relay included in this checking arrangement. Taking by way of example, for the sake of ease of description, the specific case where the register-sender concerned is the one to which the particular validity checking arrangement PCE and stores ODS, NS, CSS, and CKOS pertain, then the validity checking arrangement PCE is brought into use on the call by the completion of a testing circuit adapted to respond to the closed condition of contact *rfc* of an output signal relay RFC. At this stage, switching relays SA and SB of the validity checking arrangement PCE are unoperated, and the connections of this checking arrangement are such that the arrangement serves for checking whether the stores of the register-sender are in the condition, appropriate to the case of a coil from a special rate subscriber, in which thirteen (no more, no less) storage relays included in the stores ODS, NS, and CSS are locked up and are applying an earth signal condition to respective current input paths, each comprising a rectifier such as MRD or MRNA or MRNP or MRSC and a resistor such as RRD or RNA or RNP or RSC, connected to a current combining path WPC/1, and the single storage relay CRK of store CKOS is unoperated and is therefore not applying an earth signal condition to the relevant current input path, comprising a rectifier MRK and a resistor RK, connected to this current combining path WPC/1. If the appropriate condition obtains, the output signal relay RFC is operated.

If, at the stage now being considered, when the validity checking arrangement PCE serves for checking whether the stores of the register-sender are in the condition appropriate to the case of a call from a special rate subscriber, the output signal relay RFC is operated within a delay period measured off in a sequential control circuit of the register-sender, then relays SA and SB are operated and the send distributor SD of the register-sender is caused to start sending the digits stored in stores ODS, NS and CSS to the toll centre. If, on the other hand, the output signal relay RFC is not operated within this delay period, then relay SA is operated and a further checking operation by the validity checking arrangement PCE is initiated in which the connections of this checking arrangement are such that the arrangement serves for checking whether or not the stores of the register-sender are in one or the other of two conditions, a first one of these two conditions being the condition (appropriate to the case of a call from an ordinary subscriber) in which nine (no more, no less) storage relays included in the stores ODS, NS, and CSS are locked up and the single storage relay of store CKOS is unoperated, and a second one of these two conditions being the condition (appropriate to the case of a call where for any reason the calling subscriber is not identifiable by the automatic number identification equipment) in which the single storage relay of store CKOS is locked up and all the storage relays included in the stores ODS, NS, and CSS are unoperated. If, in the case of the further checking operation referred to, the output signal relay RFC is operated within a delay period measured off, in connection with this checking operation, in the sequential control circuit of the register-sender, and if the single storage relay of store CKOS is unoperated, then relay SB is operated in addition to relay SA already operated, and the send distributor SD is caused to start sending the digits stored in stores ODS and NS to the toll centre. If, however, such operation of relay RFC takes place with the single storage relay of store CKOS operated to signify that the call concerned is one in which the calling subscriber is not identifiable by the automatic number identification equipment, then a signal is sent to the toll centre to cause the call to be connected through to a manual board for operator identification by a so-called check operator. If, in the case of the further checking operation referred to, the output signal relay RFC is not operated within the relevant measured-off delay period, then the sequential control circuit of the register-sender causes any operated storage relays in the stores ODS, NS, CSS, and CKOS to be restored to normal and brings about, if or as soon as the automatic number identification equipment is free and available for use a further time on the call, a new cycle of operations involving the coupling of this identification equipment, to the stores ODS, NS, CSS and CKOS of the register-sender and the application of a marking condition to the relevant input conductor or conductors of this equipment and so on. If this new cycle of operations does not give rise to a successful check in which the output signal relay RFC of the validity checking arrangement PCE is operated as already mentioned, then a still further such cycle of operations is brought about, and so on until a successful check takes place or the time limit set by the toll centre equipment, and mentioned earlier in this description, expires.

When the condition is brought about that relays SA and SB of the validity checking arrangement PCE are both operated, and the send distributor SD is caused to start sending the digits stored in stores ODS and NS and (it may be) store CSS, the digits concerned are sent forward to the toll centre in sequence and in code form, the code being one which is such that the sending of a digit involves the connection of earth to two out of six wipers of a send distributor switch. For the carrying out of checks by the validity checking arrangement in respect of such digit transmission, the six wipers concerned are connected through to respective ones of six current input paths connected to a current combining path WPC/2. It is arranged that the validity checking arrangement PCE is employed to make a check in respect of each digit sent in such digit transmission. In the case of each such check, which takes place with relays SA and SB operated, the validity checking arrangement serves for determining whether there exists on the six wipers just mentioned a code signal condition that is valid at least to the extent that it conforms to a parity criterium that it involves the concurrent existence of the same relevant signal condition, namely earth, on two (no more, no less) of these wipers. If, in the case of such a check, the appropriate code signal condition does not obtain and the output signal relay RFC is not operated within the period allowed for the check, then the automatic number identification equipment is released so far as the particular call is concerned and the call is connected through to a manual board for attention by an operator.

When, as should normally be the case, a call reaches a stage in which all the requisite information as to the number of the calling subscriber and the class of service has been successfully transmitted to and received at the toll centre, then a signal is sent from the toll centre to the relevant outgoing relay set such as ORS to cause this relay set to bring about the release of the relevant register-sender of the automatic number identification equipment. The outgoing relay set such as ORS continues, of course, to be held on and to deal with the call.

What we claim is:

1. In a telephone exchange, an arrangement for automatically identifying calling numbers pertaining to lines connected to the exchange, said arrangement comprising in combination:

(a) input conductors each individual to a line connected to the exchange, (b) thousands-digit and hundreds-digit and tens-digit and units-digit decimal output conductors, (c) two groups of conductors comprising a group of thousands-hundreds conductors and a group of tens-units conductors and constituting one cross-point for and corresponding to each of a plurality of four-digit decimal numbers constituting the numbers the arrangement is capable of identifying, (d) for an individual to each of said cross-points, a cross-cross circuit comprising a pair of coupling gas-filled diodes and at least two coupling resistors and serving to couple an input conductor, individual to a line to which the particular four-digit decimal number corresponding to the cross-point pertains, to the particular thousands-hundreds conductor and tens-units conductor forming the cross-point, the coupling of said input conductor to one of these two conductors forming the cross-point being by way of one diode of the pair of coupling gas filled diodes in series with at least one coupling resistor and the coupling of said input conductor to the other of these two conductors forming the cross-point being by way of the other diode of the pair in series with at least one coupling resistor, (e) for an individual to each thousands-hundreds conductor, to isolating rectifiers over respective ones of which the conductor is coupled to a corresponding thousands-digit decimal output conductor and to a corresponding hundreds-digit decimal output conductor, and, for and individual to each tens-units conductors, two isolating rectifiers over respective ones of which the conductor is coupled to a corresponding tens-digit decimal output conductor and to a corresponding units-digit decimal output conductor, all such isolating rectifiers of the arrangement being connected in such sense that an electrical marketing condition applied, for effecting identification of the calling number in respect of a call, to the particular input conductor relevant to the call, by causing each coupling gas-filled diode of the appropriate cross-point circuit to conduct in series with at least one coupling resistor of this cross-point circuit, produces current flow in the low-resistance direction through each of the four said isolating rectifiers pertaining to the particular thousands-hundreds conductor and tens-units conductor forming the cross-point concerned, causing an output electrical marketing condition to appear upon each of the relevant four decimal output conductors, and (f) for and individual to each digit place of said four-digit decimal numbers, a group of five multi-stage output amplifiers serving for converting what is effectively a one-out-of-ten output marking as regards the decimal output conductors pertaining to the digit place into what is effectively a two-out-of-five output condition, each said amplifier being a transistor amplifier having four parallel input paths each including an isolating rectifier, and having a common input terminal to which four said decimal output conductors pertaining to the digit place are connected over respective ones of these input paths, and having its first stage constituted by a transistor connected to be controlled by the electrical condition of this common input terminal and normally in the conducting condition and adapted to be brought from the conducting condition to the cut-off condition in response to the change in the electrical condition of this common input terminal resulting from the appearance of said output electrical marking condition upon a decimal output conductor connected to this common input terminal.

2. A calling-number-identifying arrangement as claimed in claim 1 in which each said multi-stage output amplifier has a clamping rectifier connected to serve to limit the change of potential of the common input terminal of the amplifier occurring on the appearance of said output electrical marking condition upon a decimal output conductor connected to this common input terminal.

3. A calling-number-identifying arrangement as claimed in claim 1 including a pulse generator for generating, as a positive undirectional pulse, said electrical marking condition applied, for effecting identification of the calling number in respect to a call, to the particular said input conductor relevant to the call, said pulse generator including:
   (a) a pulse-timing relay having a first winding and a second winding and serving for determining, by its release lag, the duration of a said pulse generated by the pulse generator,
   (b) a timing resistor,
   (c) an energising circuit for said first winding of said pulse-timing relay closed in the normal condition of the pulse generator to saturate the relay and maintain the relay in the operated condition, and
   (d) circuit-switching means for opening said energising circuit with said second winding of said pulse-timing relay shunted by said timing resistor, to cause the relay to release with a lag determined by the value of said timing resistor.

4. In a telephone exchange, automatic number identification equipment including in combination a calling-number-identifying arrangement as claimed in claim 1 and a miscellaneous-information-deriving arrangement for automatically deriving information pertaining to a call additional to the information provided by this calling-number-identifying arrangement, said miscellaneous-information-deriving arrangement comprising in combination:
   (a) an input conductor for and corresponding to each line or station with which the arrangement is concerned,
   (b) a plurality of signalling wires,
   (c) for and corresponding to each said input conductor of the arrangement, at least one coupling circuit comprising a coupling resistor and a coupling gas-filled diode connected in series between the conductor and a signalling wire of said plurality,
   (d) a plurality of multi-stage output amplifiers, and
   (e) for each signalling wire of said plurality, at least one rectifier over which the wire is coupled to a said multi-stage output amplifier of the arrangement.

No references cited.

WILLIAM C. COOPER, *Examiner.*
KATHLEEN H. CLAFFY, *Primary Examiner.*